United States Patent
Barnes et al.

(10) Patent No.: US 10,482,069 B1
(45) Date of Patent: Nov. 19, 2019

(54) METHOD AND SYSTEM FOR IMPLEMENTING A VERSION CONTROL ADAPTIVE ARCHITECTURE PLATFORM

(71) Applicant: JPMorgan Chase Bank, N.A., New York, NY (US)

(72) Inventors: James Todd Barnes, Katy, TX (US); Farhan Ahmed, Houston, TX (US); Willie L. Brown, Jr., Jersey City, NJ (US); Stephan W. Terry, Brooklyn, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 209 days.

(21) Appl. No.: 15/668,934

(22) Filed: Aug. 4, 2017

(51) Int. Cl.
*G06F 11/00* (2006.01)
*G06F 16/18* (2019.01)
*G06F 11/16* (2006.01)
*G06F 11/20* (2006.01)

(52) U.S. Cl.
CPC ...... *G06F 16/1873* (2019.01); *G06F 11/1658* (2013.01); *G06F 11/2097* (2013.01)

(58) Field of Classification Search
CPC .................................................. G06F 11/1873
USPC ......... 714/4.11, 4.12, 4.2, 4.21, 4.3, 4.5, 4.4
See application file for complete search history.

(56) References Cited

U.S. PATENT DOCUMENTS

| 7,054,910 | B1* | 5/2006 | Nordin ............... G06F 11/2094 709/208 |
| 9,152,643 | B2* | 10/2015 | Whitehead ......... G06F 11/1448 |
| 2008/0183991 | A1* | 7/2008 | Cosmadopoulos ........................ G06F 11/2097 711/162 |
| 2009/0254572 | A1* | 10/2009 | Redlich .................. G06Q 10/06 |
| 2016/0162372 | A1* | 6/2016 | Whitehead .......... G06F 11/1451 707/654 |

* cited by examiner

*Primary Examiner* — Dieu Minh T Le
(74) *Attorney, Agent, or Firm* — Hunton Andrews Kurth LLP

(57) ABSTRACT

An embodiment of the present invention is directed to a version control adaptive architecture platform. The system comprises: a global load balancer that receives a read/write request from a user, the request comprising a URL, and determines a corresponding front-end web proxy server; a Proxy server that receives the request and using the URL, accesses a lookup table to determine a specific storage component and Subversion (SVN) server to route the request; and a plurality of SVN servers, where a SVN server, identified by the Proxy server, processes the request and returns a result to the user, wherein the SVN server has a corresponding Disaster Recovery (DR) server that monitors live data processed by the SVN server for failover mode upon detection of a failover event where the SVN server automatically reroutes traffic to the corresponding DR server.

20 Claims, 3 Drawing Sheets

METHOD AND SYSTEM FOR IMPLEMENTING A VERSION CONTROL ADAPTIVE ARCHITECTURE PLATFORM

FIELD OF THE INVENTION

The present invention generally relates to a version control adaptive architecture platform.

BACKGROUND OF THE INVENTION

Subversion (SVN) source control systems suffer from a multitude of end-user and automated requests which renders the systems slow, unstable, and without an automated manner to failover to another server in case of issue or disaster. In many cases, an entity will use a single server to support source code management. Adoption rates of the system (e.g., 30% growth per year) have increased in addition to the system becoming a firm-wide shared service available to tens of thousands of global technologists. With such growth rates, a single server is unable to support source code requirements for a global entity. With clustered environments, multiple servers may end up working on the same basic file system. This results in race conditions and other problems with inefficiencies and duplicative efforts. Race conditions generally refer to an undesirable situation that occurs when a device or system attempts to perform two or more operations at the same time.

These and other drawbacks exist.

SUMMARY OF THE INVENTION

Accordingly, one aspect of the invention is to address one or more of the drawbacks set forth above. According to an embodiment of the present invention, a version control adaptive system comprises: a global load balancer that receives a read/write request from a user, the request comprising a URL, and determines a corresponding front-end web proxy server; a Proxy server that receives the request and using the URL, accesses a lookup table to determine a specific storage component and SVN server to route the request; and a plurality of SVN servers, where a SVN server, identified by the Proxy server, processes the request and returns a result to the user, wherein the SVN server has a corresponding Disaster Recovery (DR) server that monitors live data processed by the SVN server for failover mode upon detection of a failover event where the SVN server automatically reroutes traffic to the corresponding DR server.

According to another embodiment of the present invention, an automated computer implemented method that implements a version control adaptive architecture, comprises the steps of: receiving, at a global. load balancer, a read/write request from a user, the request comprising a URL, determining a corresponding front-end web proxy server; receiving, at the front-end web proxy server, the request; using the URL, accessing a lookup table to determine a specific storage component and SVN server to route the request; identifying a SVN server from a plurality of SVN servers; processing, at the SVN server, the request; and returning a result to the request to the user; wherein the SVN server has a corresponding DR server that monitors live data processed by the SVN server for failover mode upon detection of a failover event where the SVN server automatically reroutes traffic to the corresponding DR server.

The computer implemented system, method and medium described herein provide unique advantages to global entities that implement disaster recovery systems. The innovative system and method incorporates multiple servers into a production offering, yielding improved performance. With an embodiment of the present invention, failover capacity with multiple hosts may distribute a reduced load. Users are able to bypass the proxy and interact directly with SVN servers for improved performance. Moreover, production capacity is limited by the number of hosts assigned to the service. Automated fail-over to Disaster Recovery (DR) improves current Hot-Swap architecture. With an innovative lookup table, race condition of multiple SVN servers writing against the same repository may be avoided. These and other advantages will be described more fully in the following detailed description.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

Figure 1:
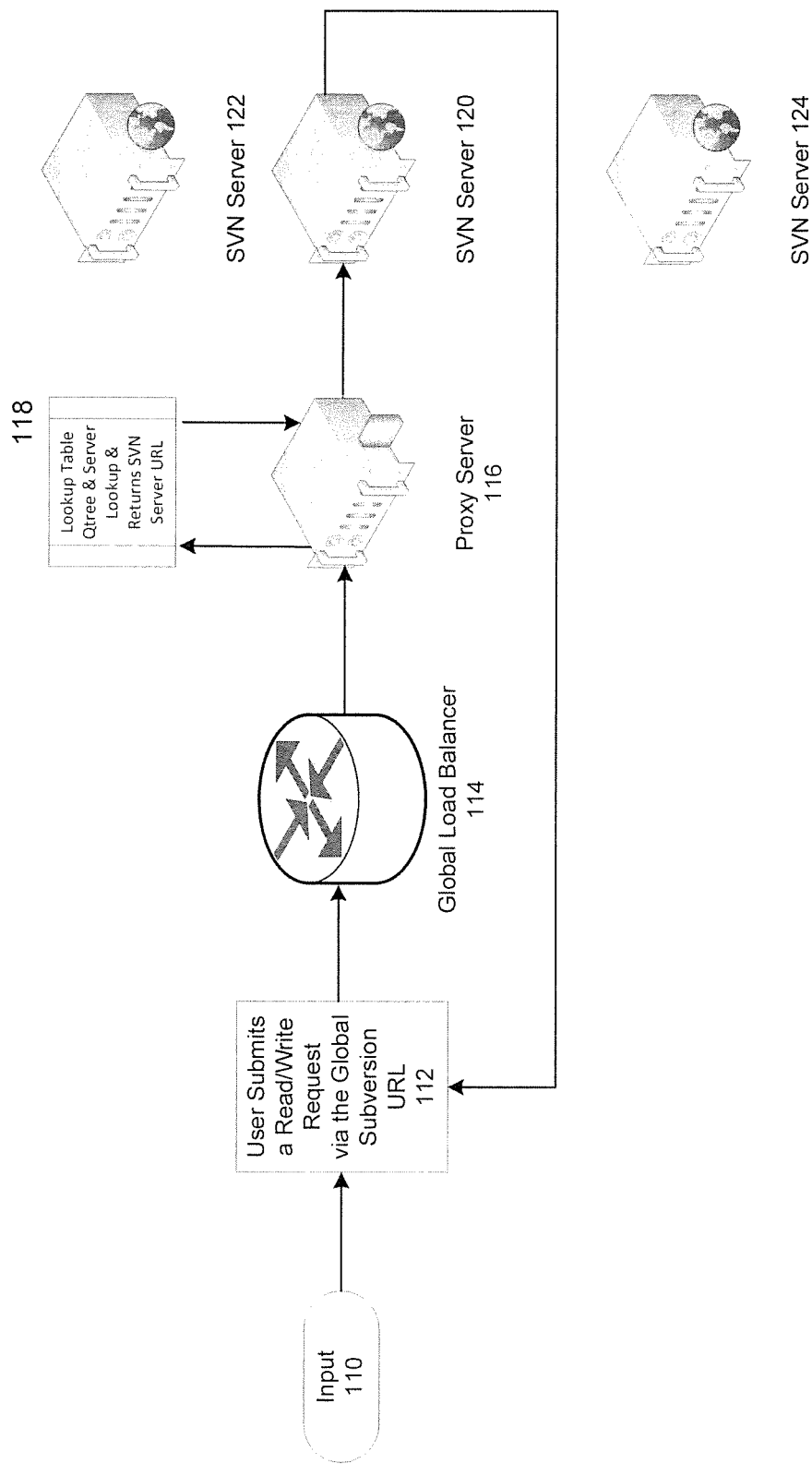
FIG. 1 is an exemplary system diagram, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Version control systems manage files and directories and any changes made to them. Software developers use version control systems to maintain current and historical versions of files, such as source code, web pages and other documentation. Version control systems further help software developers to work together and maintain a complete history of their work.

An embodiment of the present invention is directed to a version control platform that is load balanced across a multitude of servers. An embodiment of the present invention is directed specifically to source code control. The platform may include a proxy server (e.g., Apache proxy server) that automatically redirects incoming traffic to a specific server which housed the source code requested. An embodiment of the present invention addresses the need to have one URL as the basis of all incoming requests (and to not break existing links). For example, systems may have multiple servers working on the same things unbeknownst to one another, where all of the systems, build and release notes links to one particular URL. Accordingly, such systems can avoid breaking an entire bank board system and every referential document used throughout.

According to an embodiment of the present invention, the platform may implement a single server for a specific repository so that multiple simultaneous actions do not occur on the same files at the same time across servers. The system may then be load balanced with large or heavily-used source code repositories being moved to less-used servers automatically to balance an overall platform load. Additionally, the system may automatically failover if a server becomes unavailable and reset when the initial server is back in service. The failover/fallback design of an embodiment of the present invention provides enhanced platform uptime in systems that require a high amount of source code entry, reporting, and automation.

An embodiment of the present invention is directed to a proxy server lookup table that directs requests to a specific server where the load may be spread across servers without production interruption. The failover/fallback system is critical to firm-wide service operations and is much higher than competing architectural platforms.

In addition, adaptive end-user throttling of potential automated actions may be incorporated into the platform.

An embodiment of the present invention is directed to mitigating the risk associated with possible race condition whereby multiple SVN servers access and write to the same NAS filers. This creates an unstable environment or a corruption of the repositories themselves. An embodiment of the present invention is directed to including a separate Virtual Machine (VM) that operates a web server (e.g., Apache server) to balance the request load across the SVN production environment according to a managed lookup table.

An embodiment of the present invention is directed to a lookup table that separates the SVN repository population by a subset of the procured NAS Q Trees. As SVN repositories are wholly contained on a distinct NAS filer, an architecture of an embodiment of the present invention ensures a single SVN instance will read/write to a single repository. As a result, the race condition present in other solutions may be minimized and avoided.

The lookup table of an embodiment of the present invention may be generated from SVN directory mounts which store the actual repository files. The lookup table may be automatically updated from an administration console (e.g., FAST DS system) whenever a new SVN repository is created, deleted, renamed or archived as the respective directory mount on the respective system may be updated.

When a request is processed against the web server (e.g., Apache server), the lookup table may be accessed to determine on which Q Tree the repository resides and to which target SVN server may process the request. Therefore, the production system may have a much higher capacity in that additional production hosts may be added to the system and the corresponding lookup table modified to add and/or rebalance Q Tree access.

As entities experience growth and expansion, they realize that a single server is not capable of supporting source code requirements for a global entity. Existing solutions for clustered environments involve multiple servers working on the same basic file system. For example, there may be five servers that could fundamentally and theoretically work on the same file at the exact same time. With large global companies, there may be many employees working on the same system concurrently. An embodiment of the present invention ensures that one particular server is working on one particular step of action at a time. The underlying software may recognize which action has priority and would perform the actions as designed.

An embodiment of the present invention is directed to a once-again architecture that may be expanded in any scale as needed or desired. For example, if an entity wants 10 servers or 1,000 servers, the system architecture of an embodiment of the present invention may support that. According to an embodiment of the present invention, the backend subversion servers process a particular set of source codes requests at a time in a segregated manner. For example, an entity may have 10,000 repositories. Out of the 10,000 repositories, a set of servers may process requests for specified units, to avoid overlap. Additionally, if one server becomes overtaxed (e.g., working on a repository that has a high degree of automation, a high degree of reporting or just a lot of development work), an embodiment of the present invention may move one or more repositories from the server to another on the backend. This may occur within a few seconds in a manner that is transparent to the backend users.

According to another example, an entity may have all of the source code running on one particular platform that has 10,000 repositories and 10 servers. If one server goes down during the middle of the day and it experiences a critical issue, this could impact 1,000 repositories and thousands of developers at that particular time. An embodiment of the present invention is directed to a system that is reliant in that the system may automatically failover in case an issue is detected and continue to process requests and data. With an embodiment of the present invention, the system may automatically failover to a DR machine while still processing and accessing active live system files.

Current systems include DR servers located on a different data centers in various regions in case there is a hurricane, a flood, a power outage, etc. With current systems, if something in production fails, the entity is generally required to invoke manual intervention involving manual copying, changing read and write operations, and revising directional flow between production (PROD) to disaster recovery (DR). For example, if a particular server experiences an issue during operating hours, this could result in hours of downtime for teams around the world and could also impact the lines of business as well as clients and customers.

With an embodiment of the present invention, the DR system monitors a live file system (instead of looking at the DR call system). When cross-mounting the live production data in DR and the DR system, the DR system may monitor live data as the data is being written. In this scenario, the DR system is waiting and ready to be activated. Accordingly, if a production server goes down, the server may transition immediately into DR. As a result, DR application servers may then process incoming requests against the live data. For example, an end-user may try to perform a connect or try to check in their changes. If an error occurs, the server will go down and the end-user may get an error. By monitoring the live data, the server may instantly transition to DR so that when the end-user clicks it again, the user will get through.

An embodiment of the present invention may also analyze production server errors and determine a reason for failure as well as status of maintenance. For example, while the system patches a production server, the system may 1 finish any transactions that are still pending in DR and then transition back to production. In this scenario, a new incoming requests may be received at production, the request may then be processed in DR and then transition back to production. An embodiment of the present invention is directed to improved reliability and stability.

In current systems, a single URL is used to reference source code, builds and release notes. Accordingly, an embodiment of the present invention is directed to maintaining the use of a single URL without breaking current references used by an entity. According to an embodiment of the present invention, the system may implement front end web servers (e.g., Apache servers) that serve as a particular proxy. When a URL is received (e.g., mycode.com) at a front end web server (e.g., Apache server), the server reads the URL string and identifies what action (e.g., read, write, etc.) is to be performed on a particular repository. The system may then access a look up table that indicates that a particular repository is located on a particular NAS filer and further allocates the NAS filer to server 5. The system may route the request to the server 5. As a result, all the traffic is redirected for all 2,000 repositories.

According to another example, if a particular repository is moved, the system may initiate a change on the back-end. The system may also move an entire file system, thousands of repositories at once or hundreds of repositories. To accommodate such changes, the system may make changes on the back end and further update the lookup table so that processing will occur on a different server.

According to an exemplary scenario, the lookup table may be updated in the order of 75-100 times a day as new repositories are being added and current repositories are being updated, renamed, deleted, etc. For example, an entity may create a new project with an associated new repository for the project.

An embodiment of the present invention is directed to an automated rebalancing from an operational perspective. For example, the system may recognize that a particular storage tree is approaching capacity. For example, a particular Q tree may operate at 80% storage. The system may recognize that the particular repository is near or at capacity and initiate an automatic rebalance. Also, the system may monitor storage behavior and trending data. For example, the system may recognize that a server load is above a predetermined high threshold for more than a threshold period of time (e.g., more than 5 days, etc.). An embodiment of the present invention may automatically move a repository from one filer to another filer that is less contentious and has less load. In addition, the system may automatically rebalance based on the load (e.g., current load, projected load, historical load, etc.) and filer features (device specific features) and/or other factors, preferences, regulations, etc. The rebalancing may be based on triggering events (e.g., load is above a threshold level, detection of unequal distribution, high variance among a set of devices, etc.) and may also be initiated periodically (e.g., end of the day, etc.).

FIG. 1 is an exemplary system diagram, according to an embodiment of the present invention. As shown in FIG. 1, SVN Process diagram illustrates 1 . . . n number of Proxy servers (e.g., Apache Proxy servers) and 1 . . . n number of Subversion (SVN) servers that process source code repository requests via a single URL and with a specific backend SVN server processing the request so as to avoid contention and possible corruption. As long as there are servers and storage, an embodiment of the present invention may support any size of source code repository offering. As shown in FIG. 1, a process may be initiated at 110. A user may submit a request 112. The request may include a read or write request. The request may be submitted via a global URL. The request is then processed through a Global Load Balancer 114. The request may then be sent to a Proxy Server 116. Proxy Server 116 may access a Lookup Table 118 to identify a SVN Server. Proxy Server 116 may then select the identified SVN Server 120 out of a group of SVN Servers 122, 124 to process the request and return the result.

Figure 2:
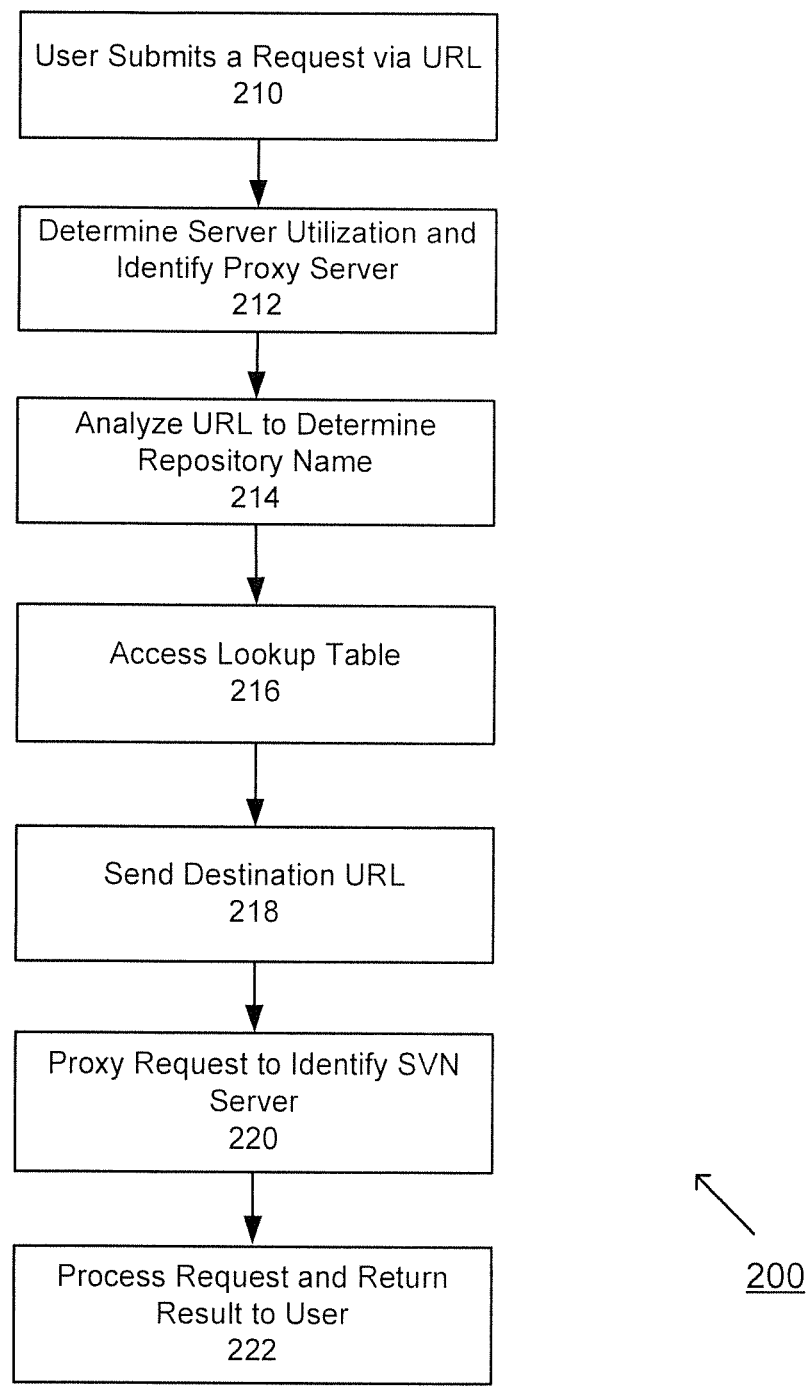
FIG. 2 is an exemplary flow diagram, according to an embodiment of the present invention.

FIG. 2 is an exemplary flow diagram, according to an embodiment of the present invention. At step 210, a user submits a read/write request via a URL. At step 212, a global load balancer processes the request to determine server utilization and identify a Proxy Server. At step 214, the Proxy Server analyzes the URL to determine a repository name. At step 216, using the repository name, the Proxy Server accesses a lookup table to determine storage and a server to route to. At step 218, a destination URL is sent to a Proxy Server. At step 220, the Proxy Server proxies the request to the identified SVN Server. At step 222, the SVN Server processes the request and returns a result to the user. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
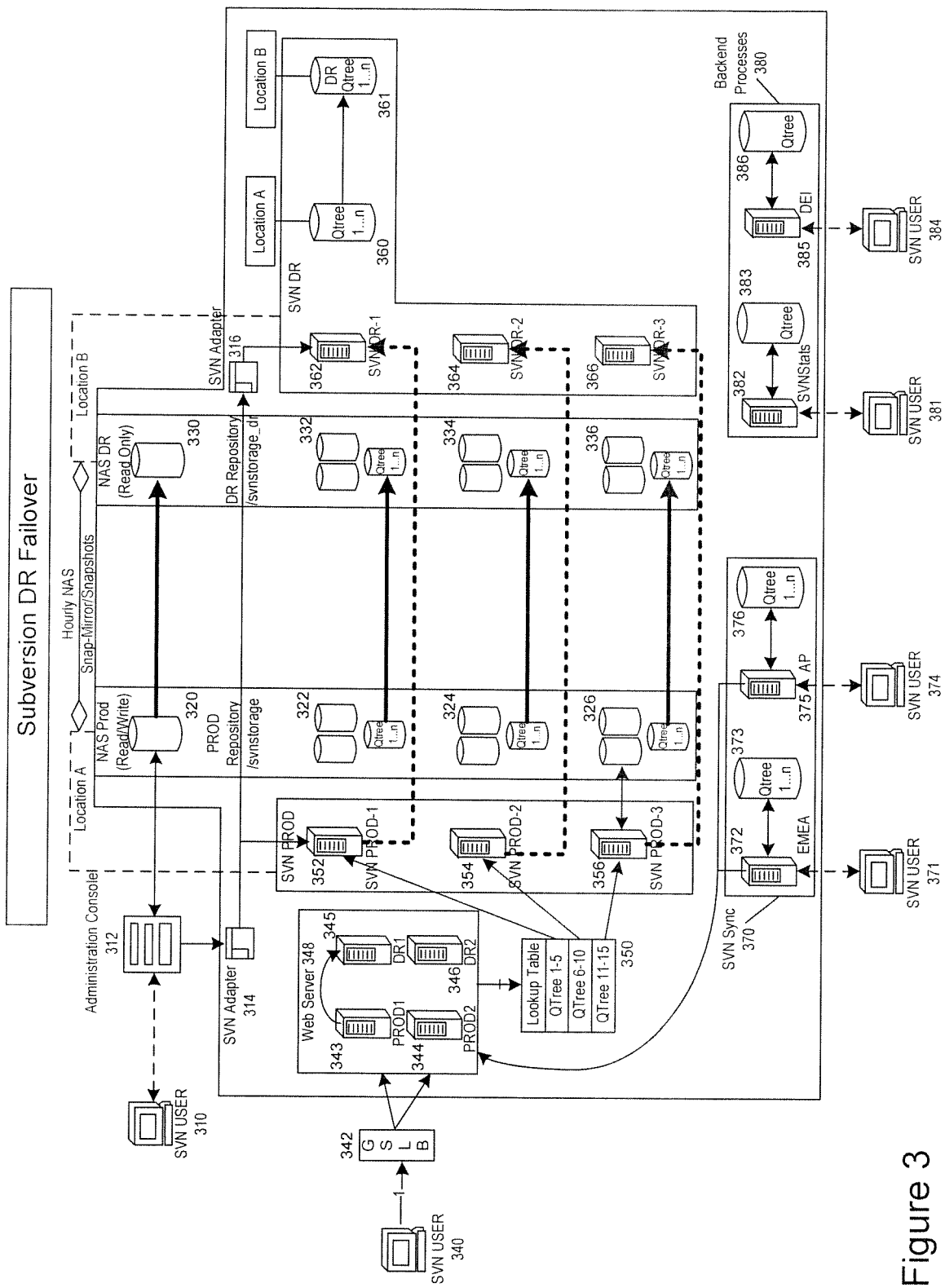
FIG. 3 is an exemplary system diagram illustrating subversion DR failover, according to an exemplary embodiment.

FIG. 3 is an exemplary system diagram illustrating subversion DR failover, according to an exemplary embodiment. The SVN DR Failover system illustrated in FIG. 3 demonstrates how proxy servers and/or SVN servers can fail in production and how requests may be automatically routed to their disaster recovery counterpart. According to an embodiment of the present invention, this may happen in a matter of seconds (e.g., less than 3 seconds, on average) and when the production server is back online (due to failure or scheduled maintenance), the disaster recovery server(s) may finish their current processes and defer other processes back to their corresponding production server. This automated failover/fallback scenario ensures the resiliency of the system and provides the operations team the ability to take a server out of rotation for analysis, upgrade, maintenance, etc. without disruption to the end-users.

Disaster Recovery (DR) invocation may depend on a component that has failed for a virtual environment. For various components that may fail, a corresponding procedure may be followed to invoke DR for that particular component.

An embodiment of the present invention may address administrative console failures. User and access management may be handled by a FAST Developer Services (DS) platform. FAST DS may represent a user/repository administration console. The FAST DS platform performs end-user workflow without adding to the overall development scope. For a Failover Plan, the last write to a SVN server may remain in place, where no new SVN authorization/configurations may be made. However, normal read/write access to the SVN system may be available until the administration console is back in service. For example, an exemplary FAST DS system may have no failure or hot-swappable system enabled. Accordingly, no changes could be made to SVN system while the FAST DS system is unavailable. The SVN servers would use the existing authorization, password and lookup table while the FAST DS system is re-enabled. As shown in FIG. 3, SVN User 310 may access an Administration Console at 312, that communicates to SVN Adapter 314. Administration Console 312 may provide communication between a user and servers. For example, a user may request a new repository, add users, set permissions and perform other functions via the Administration Console 312.

For example, a FAST DS application may provide a flat file format for both the authentication and the password files. This ensures if the FAST application were unavailable, the SVN service may continue without interruption. Users may be unable to perform the primary functions of the FAST DS system (e.g., password resets, user on/off-boarding, project creation and modification); however, these actions may be deemed as non-critical to the SCM service as a whole.

As shown in 348, an Apache server may failover to an Apache DR system. For example, a user 340 may request a particular usage right. Global Load Balancer 342 may send a request to Apache instances 343 and 344 with local load balancing between multiple DR servers, represented by DR servers 345 and 346.

Web servers represented by 348 may access Lookup Table 350, which may be based on SVN repository mounts and may be automatically synchronized against a respective Prod/DR NAS filers to which it is directed. For example, a server may become busy and overtaxed. The system automatically may move the associated mounts (e.g., Q Trees) to another server to balance an entire environment from a server level or storage level.

For example, Lookup Table 350 may be synchronized against Production Servers, Prod 352, 354 and 356. In this example, Prod 356 is synchronized with Q Tree 326. A Q Tree may represent a tree data structure where each internal node has multiple children nodes (e.g., N number of nodes). Other storage components and structures may be implemented in accordance with the various embodiments of the present invention. Web servers 348 may represent any number of servers.

Each production server may be paired to a corresponding DR pair to maintain a standard capacity model. For example, production server, PROD 352, is paired to disaster recovery server, DR 362. PROD 354 is paired to DR 364. PROD 356 is paired to DR 366. By using a multi-host system, a single server may failover to a corresponding DR without impacting an overall production service. For example, each DR system may mount Prod/DR NAS filers in order to maintain the operational load while the UNIX/SCM team analyzes the production system and brings it back online. A network-attached storage filer (NAS filer) may represent a file server with massive storage capacity; the devices are designed for backup, archiving and sharing Ethernet connectivity. NAS filers are also known as storage file servers, storage-area network (SAN) filers or storage filers. Other storage devices and components may be implemented.

FIG. 3 illustrates SVN Synchronization Servers 370. As shown in FIG. 3, User 371 interacts with EMEA 372 and Q Tree 373. Similarly, User 374 interacts with AP 375 and Q Tree 376. EMEA 372 and AP 374 may represent a geographic area or other region. The SVN Synchronization servers, represented by 370, automatically reroute traffic to a main production Apache server in case of a failover or a scheduled maintenance event. The servers automatically roll-forward once online.

Upon the failure of a specific Q Tree, a NAS would failover to the DR pair. In addition, the automated snap-mirror may be disabled and the NAS permissions may be reversed (e.g., DR r/w, Prod r). The snap-mirror may flow from DR to PROD until the PROD was back in service. Actions regarding the NAS Q trees may require involvement of UNIX SA support team. Both Prod and DR SVN servers mount Prod and DR NAS filers. As shown NAS PROD 320 may backup to NAS DR 330. Similarly, Q Trees 322 may backup to 332; Q Trees 324 may backup to 334 and Q Trees 326 may backup to 336. Also, Q Trees 360 in one location may backup to DR 361 in another location.

FIG. 3 illustrates Backend Processes 380. As shown in FIG. 3, User 381 interacts with SVNStats 382 and Q Tree 383. SVNStats represents SVN repository logs generated to a separate VM platform to decrease the operational workload of the production system. A separate NAS filer may store the resulting reports for client use. Similarly, User 384 interacts with Development Efficiency Index (DEI) 385 and Q Tree 386. Depending upon the extent of a DR failover, the backend processes may be suspended to insure the viability of the system. DEI 385 may represent an external system that accesses or relies on source code as a data point.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A version control adaptive system comprising:
    a global load balancer that receives a read/write request from a user, the request comprising a URL, determines a corresponding front-end web proxy server, and transmits the request to the corresponding front-end web proxy server;
    a Proxy server that receives the request from the global load balancer and using the URL, accesses a lookup table to determine a specific storage component and Subversion (SVN) server to route the request, and routes the request to the specific SVN; and
    a plurality of SVN servers, where the SVN server, identified by the Proxy server, processes the request and returns a result to the user, wherein the SVN server has a corresponding Disaster Recovery (DR) server that monitors live data processed by the SVN server for failover mode upon detection of a failover event where the SVN server automatically reroutes traffic to the corresponding DR server.

2. The system of claim 1, wherein the failover event comprises a scheduled maintenance event.

3. The system of claim 1, wherein the lookup table is automatically synchronized against respective Production and DR NAS filers to which it is directed.

4. The system of claim 1, wherein based on the failover event, one or more backend processes are suspended.

5. The system of claim 1, wherein the URL references source code, software build and release notes.

6. The system of claim 1, wherein the SVN server comprises a plurality of Q Trees.

7. The system of claim 1, wherein DR server comprises a plurality of Q Trees.

8. The system of claim 1, wherein one or more repositories associated with the SVN server are automatically rebalanced based on load determinations.

9. The system of claim 1, wherein one or more repositories associated with the DR server are automatically rebalanced based on load determinations.

10. The system of claim 1, wherein the lookup table is automatically updated based on updates to one or more associated repositories.

11. A computer implemented method for implementing a version control adaptive architecture, the method comprising the steps of:
- receiving, at a global load balancer, a read/write request from a user, the request comprising a URL;
- determining a corresponding front-end web proxy server;
- transmitting, from the global load balancer, the request to the corresponding front-end web proxy server;
- receiving, at the front-end web proxy server, the request from the global load balancer;
- using the URL, accessing a lookup table to determine a specific storage component and Subversion (SVN) server to route the request;
- identifying a SVN server from a plurality of SVN servers;
- routing, via the proxy server, the request to the SVN server;
- processing, at the SVN server, the request; and
- returning a result to the request to the user;
- wherein the SVN server has a corresponding Disaster Recovery (DR) server that monitors live data processed by the SVN server for failover mode upon detection of a failover event where the SVN server automatically reroutes traffic to the corresponding DR server.

12. The method of claim 11, wherein the failover event comprises a scheduled maintenance event.

13. The method of claim 11, wherein the lookup table is automatically synchronized against respective Production and DR NAS filers to which it is directed.

14. The method of claim 11, wherein based on the failover event, one or more backend processes are suspended.

15. The method of claim 11, wherein the URL references source code, software build and release notes.

16. The method of claim 11, wherein the SVN server comprises a plurality of Q Trees.

17. The method of claim 11, wherein DR server comprises a plurality of Q Trees.

18. The method of claim 11, wherein one or more repositories associated with the SVN server are automatically rebalanced based on load determinations.

19. The method of claim 11, wherein one or more repositories associated with the DR server are automatically rebalanced based on load determinations.

20. The method of claim 11, wherein the lookup table is automatically updated based on updates to one or more associated repositories.

* * * * *